United States Patent
Chunduri et al.

(10) Patent No.: US 9,300,568 B2
(45) Date of Patent: Mar. 29, 2016

(54) PROCEDURE TO ADD ALTERNATE PATHS FOR IS-IS DEFAULT ROUTE

(71) Applicant: Telefonaktiebolaget L M Ericsson (publ), Stockholm (SE)

(72) Inventors: Uma S. Chunduri, Fremont, CA (US); Vasant S. Patil, San Jose, CA (US); Wenhu Lu, San Jose, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 70 days.

(21) Appl. No.: 14/222,243

(22) Filed: Mar. 21, 2014

(65) Prior Publication Data
US 2015/0271052 A1 Sep. 24, 2015

(51) Int. Cl.
H04L 12/54 (2013.01)
H04L 12/733 (2013.01)
H04L 12/707 (2013.01)
H04L 12/715 (2013.01)
H04L 12/721 (2013.01)
H04L 12/705 (2013.01)

(52) U.S. Cl.
CPC ............. *H04L 45/122* (2013.01); *H04L 45/04* (2013.01); *H04L 45/12* (2013.01); *H04L 45/18* (2013.01); *H04L 45/22* (2013.01)

(58) Field of Classification Search
CPC ......... H04L 45/18; H04L 45/20; H04L 45/22; H04L 45/12; H04L 45/122
See application file for complete search history.

(56) References Cited

U.S. PATENT DOCUMENTS

| | | | |
|---|---|---|---|
| 8,165,121 B1* | 4/2012 | Singh | 370/389 |
| 8,861,340 B1* | 10/2014 | Atlas | 370/225 |
| 2006/0187819 A1* | 8/2006 | Bryant et al. | 370/216 |
| 2008/0008104 A1* | 1/2008 | Previdi | H04L 12/66 370/255 |
| 2008/0049622 A1* | 2/2008 | Previdi et al. | 370/237 |
| 2009/0067322 A1* | 3/2009 | Shand et al. | 370/225 |
| 2011/0007629 A1 | 1/2011 | Atlas et al. | |
| 2012/0075988 A1* | 3/2012 | Lu et al. | 370/218 |
| 2012/0236860 A1* | 9/2012 | Kompella | H04L 45/18 370/392 |
| 2013/0107698 A1* | 5/2013 | Bejerano | H04L 45/122 370/218 |
| 2013/0301403 A1* | 11/2013 | Esale et al. | 370/221 |
| 2013/0308444 A1* | 11/2013 | Sem-Jacobsen | H04L 47/125 370/230 |

(Continued)

OTHER PUBLICATIONS

Atlas, A., et al., "Basic Specification for IP Fast Reroute; Loop-Free Alternates", *Network Working Group*, RFC 5286, Standards Track, Sep. 2008, 32 pages.

(Continued)

*Primary Examiner* — Kevin Mew
(74) *Attorney, Agent, or Firm* — Nicholson, De Vos, Webster & Elliot, LLP

(57) ABSTRACT

A method is implemented by a network device to determine loop free alternatives (LFA) for each next hop in a default route to border nodes of a level 1 intermediate system-intermediate system (IS-IS) area of the network device. The method selects a next next-hop for the default route and looks up a corresponding border node for the selected next-hop in a local routing information base (RIB). A next next-hop of the corresponding border node is selected. A check is made whether the selected next-hop of the corresponding border node is the same as selected next-hop of default route. Then an LFA of the selected next-hop of the corresponding border node is assigned as LFA of the selected next-hop of the default route.

19 Claims, 8 Drawing Sheets

(56) References Cited

U.S. PATENT DOCUMENTS

| | | | | |
|---|---|---|---|---|
| 2014/0098711 | A1* | 4/2014 | Thubert | H04L 45/128 370/255 |
| 2014/0219090 | A1* | 8/2014 | Ramanathan et al. | 370/235 |
| 2014/0219275 | A1* | 8/2014 | Allan et al. | 370/390 |
| 2014/0269261 | A1* | 9/2014 | D'Souza et al. | 370/225 |
| 2015/0023156 | A1* | 1/2015 | Csaszar et al. | 370/228 |
| 2015/0103671 | A1* | 4/2015 | Ernstrom et al. | 370/238 |
| 2015/0244615 | A1* | 8/2015 | Esale | H04L 45/507 370/389 |
| 2015/0271056 | A1* | 9/2015 | Chunduri | H04L 45/02 370/238 |
| 2015/0271059 | A1* | 9/2015 | Chunduri | H04L 45/12 370/400 |
| 2015/0350059 | A1* | 12/2015 | Chunduri | H04L 45/18 370/238 |
| 2015/0350060 | A1* | 12/2015 | Patil | H04L 45/12 370/238 |
| 2015/0350061 | A1* | 12/2015 | Chunduri | H04L 41/0654 370/228 |
| 2015/0350062 | A1* | 12/2015 | Lindem, III | H04L 45/22 370/220 |

OTHER PUBLICATIONS

Callon, R., et al., "Use of OSI IS-IS for routing in TCP/IP and Dual Environments", *RFC 1195*; Dec. 1990; http://tools.ietf.org/rfc/rfc1195.txt; 80 pages.

J. Postel, "User Datagram Protocol," Aug. 28, 1980, 3 pages, RFC: 768.

"Transmission Control Protocol, DARPA Internet Program Protocol Specification," Sep. 1981, 91 pages, RFC: 793, Information Sciences Institute, University of Southern California, Marina del Rey, California.

C. Hedrick, "Routing Information Protocol," Jun. 1988, 33 pages, Network Working Group, Request for Comments: 1058.

David Oran, "OSI IS-IS Intra-domain Routing Protocol," Feb. 1990, 157 pages, Network Working Group, Request for Comments: 1142.

T. Socolofsky, et al., "A TCP/IP Tutorial," Jan. 1991, 28 pages, Network Working Group, Request for Comments: 1180.

G. Malkin, et al., "RIPng for IPv6," Jan. 1997, 19 pages, Network Working Group, Request for Comments: 2080.

R. Braden, et al., "Resource ReSerVation Protocol (RSVP)—Version 1 Functional Specification," Sep. 1997, 112 pages, Network Working Group, Request for Comments: 2205.

J. Wroclawski, "The Use of RSVP with IETF Integrated Services," Sep. 1997, 33 pages, Network Working Group, Request for Comments: 2210.

J. Wroclawski, "Specification of the Controlled-Load Network Element Service," Sep. 1997, 19 pages, Network Working Group, Request for Comments: 2211.

S. Shenker, et al., "Specification of Guaranteed Quality of Service," Sep. 1997, 20 pages, Network Working Group, Request for Comments: 2212.

J. Moy, "OSPF Version 2," Apr. 1998, 244 pages, Network Working Group, Request for Comments: 2328, The Internet Society.

G. Malkin, "RIP Version 2," Nov. 1998, 39 pages, Network Working Group, Request for Comments: 2453, The Internet Society.

S. Deering, et al., "Internet Protocol, Version 6 (IPv6) Specification," Dec. 1998, 39 pages, Network Working Group, Request for Comments: 2460, The Internet Society.

K. Nichols, et al., "Definition of the Differentiated Services Field (DS Field) in the IPv4 and IPv6 Headers," Dec. 1998, 20 pages, Network Working Group, Request for Comments: 2474, The Internet Society.

S. Blake, et al., "An Architecture for Differentiated Services," Dec. 1998, 36 pages, Network Working Group, Request for Comments: 2475, The Internet Society.

J. Heinanen, et al., "Assured Forwarding PHB Group," Jun. 1999, 11 pages, Network Working Group, Request for Comments: 2597, The Internet Society.

D. Borman, et al., "IPv6 Jumbograms," Aug. 1999, 9 pages, Network Working Group, Request for Comments: 2675, The Internet Society.

D. Black, "Differentiated Services and Tunnels," Oct. 2000, 14 pages, Network Working Group, Request for Comments: 2983, The Internet Society.

D. Thaler, et al "Multipath Issues in Unicast and Multicast Next-Hop Selection," Nov. 2000, 9 pages, Network Working Group, Request for Comments: 2991, The Internet Society.

C. Hopps, "Analysis of an Equal-Cost Multi-Path Algorithm," Nov. 2000, 8 pages, Network Working Group, Request for Comments: 2992, The Internet Society.

K. Nichols, et al., "Definition of Differentiated Services Per Domain Behaviors and Rules for their Specification," Apr. 2001, 24 pages, Network Working Group, Request for Comments: 3086, The Internet Society.

D. Black, et al., "Per Hop Behavior Identification Codes," Jun. 2001, 8 pages, Network Working Group, Request for Comments: 3140, The Internet Society.

D. Awduche, et al., "RSVP-TE: Extensions to RSVP for LSP Tunnels," Dec. 2001, 61 pages, Network Working Group, Request for Comments: 3209, The Internet Society.

B. Davie, et al., "An Expedited Forwarding PHB (Per-Hop Behavior)," Mar. 2002, 16 pages, Network Working Group, Request for Comments: 3246, The Internet Society.

A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.

D. Grossman, "New Terminology and Clarifications for Diffserv," Apr. 2002, 10 pages, Network Working Group, Request for Comments: 3260, The Internet Society.

F. Baker, et al., "Management Information Base for the Differentiated Services Architecture," May 2002, 116 pages, Network Working Group, Request for Comments: 3289, The Internet Society.

Y. Bernet, et al., "An Informal Management Model for Diffsery Routers," May 2002, 56 pages, Network Working Group, Request for Comments: 3290, The Internet Society.

K. Chan, et al., "Differentiated Services Quality of Service Policy Information Base," Mar. 2003, 96 pages, Network Working Group, Request for Comments: 3317, The Internet Society.

L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.

K. Kompella, et al., "Procedures for Modifying the Resource reSerVation Protocol (RSVP)," Oct. 2004, 7 pages, Network Working Group, Request for Comments: 3936, The Internet Society.

B. Fenner, et al., "Management Information Base for the User Datagram Protocol (UDP)," Jun. 2005, 19 pages, Network Working Group, Request for Comments: 4113, The Internet Society.

Y. Rekhter, et al., "A Border Gateway Protocol 4 (BGP-4)," Jan. 2006, 104 pages, Network Working Group, Request for Comments: 4271, The Internet Society.

S. Kent, et al., "Security Architecture for the Internet Protocol," Dec. 2005, 101 pages, Network Working Group, for Comments: 4301, The Internet Society.

R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.

E. Rosen, et al., "BGP/MPLS IP Virtual Private Networks (VPNs)," Feb. 2006, 47 pages, Network Working Group, Request for Comments: 4364, The Internet Society.

J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.

Z. Ali, et al., "Node-ID Based Resource Reservation Protocol (RSVP) Hello: A Clarification Statement," Jun. 2006, 7 pages, Network Working Group, Request for Comments: 4558, The Internet Society.

J. Babiarz, et al., "Configuration Guidelines for DiffServ Service Classes," Aug. 2006, 57 pages, Network Working Group, Request for Comments: 4594, The Internet Society.

(56) References Cited

OTHER PUBLICATIONS

L. Andersson, et al., "LDP Specification," Oct. 2007, 135 pages, Network Working Group, Request for Comments: 5036, The IETF Trust.

R. Coltun, et al., "OSPF for IPv6," Jul. 2008, 94 pages, Network Working Group, Request for Comments: 5340, The IETF Trust.

L. Eggert, et al., "Unicast UDP Usage Guidelines for Application Designers," Nov. 2008, 27 pages, Network Working Group, Request for Comments: 5405, IETF Trust and the persons identified as the document authors.

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

\* cited by examiner

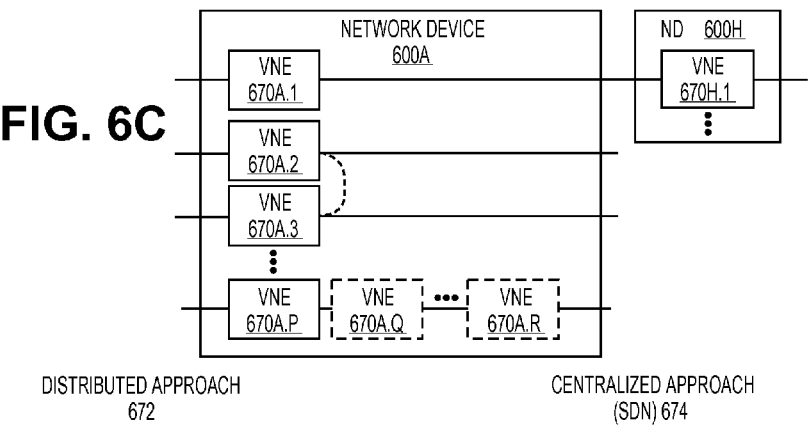
FIG. 6C
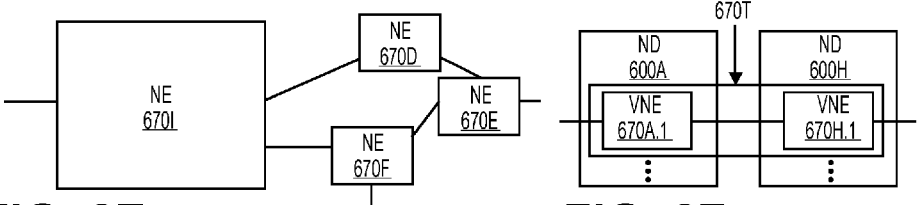
FIG. 6D
FIG. 6E
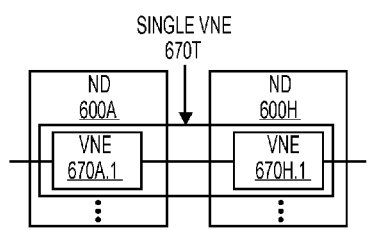
FIG. 6F

PROCEDURE TO ADD ALTERNATE PATHS FOR IS-IS DEFAULT ROUTE

FIELD

Embodiments of the invention relate to the field of intermediate system to intermediate system (IS-IS) routing protocol. More specifically, the embodiments related to the computation of loop free alternative (LFA) routes for default routes to border nodes of an IS-IS area.

BACKGROUND

RFC 1195 [IS-IS for IP Networks] describes the use of default routes for each router in an IS-IS area to reach a border router between the level 1 IS-IS area of the router and the level 2 IS-IS domain. According to RFC 1195 a default route must be determined for each L1 router to reach the closest reachable L1/L2 border router in the network advertising attach (ATT) bit in its link state protocol (LSP)-0 fragment. All L1 routers in the IS-IS area would do this during their respective convergence process with the next hop of the default route set to the adjacent router through which the closest L1/L2 border router is reachable.

When the adjacent router or the link to that adjacent router designated as the next hop for the default route fails, traffic disruption will occur until the network re-converges. This disruption of traffic can be prevented by the Loop Free Alternatives (LFA) technology in principle as specified in RFC 5286. However, the specification (RFC 5286) doesn't specify any procedure that can be applied to the default route in particular. In many instances the standard LFA process however will not identify an optimal LFA for default routes.

The LFA that are identified with the standard process may fail to identify possible LFA that provide better coverage and better level of protection thereby causing increased traffic disruption in an IS-IS area in response to failures of links or nodes in the IS-IS area.

SUMMARY

A method is implemented by a network device to determine loop free alternatives (LFA) for each next hop in a default route to border nodes of a level 1 intermediate system-intermediate system (IS-IS) area of the network device. The method selects a next next-hop for the default route. The method looks up a corresponding border node for the selected next-hop in a local routing information base (RIB and selects a next next-hop of the corresponding border node. A check is made whether the selected next-hop of the corresponding border node is the same as selected next-hop of default route. An LFA of the selected next-hop of the corresponding border node is assigned as LFA of the selected next-hop of the default route.

A network device is configured to determine loop free alternatives (LFA) for each next hop in a default route to border nodes of a level 1 intermediate system-intermediate system (IS-IS) area of the network device. The network device includes a data store to store a routing information base (RIB) and a processor communicatively coupled to the data store. The processor is configured to execute an IS-IS module. The IS-IS module is configured to select a next next-hop for the default route, to look up a corresponding border node for the selected next-hop in a local routing information base (RIB), to select a next next-hop of the corresponding border node, to check whether the selected next-hop of the corresponding border node is the same as selected next-hop of default route, and to assign an LFA of the selected next-hop of the corresponding border node as LFA of the selected next-hop of the default route.

A non-transitory computer readable medium has instructions stored therein, which when executed determine loop free alternatives (LFA) for each next hop in a default route to border nodes of a level 1 intermediate system-intermediate system (IS-IS) area of a network device. The execution further causes the network device to perform a set of operations including, selecting a next next-hop for the default route, looking up a corresponding border node for the selected next-hop in a local routing information base (RIB), selecting a next next-hop of the corresponding border node, checking whether the selected next-hop of the corresponding border node is the same as selected next-hop of default route, and assigning an LFA of the selected next-hop of the corresponding border node as LFA of the selected next-hop of the default route.

A control plane device is configured to determine loop free alternatives (LFA) for each next hop in a default route to border nodes of a level 1 intermediate system-intermediate system (IS-IS) area of a network device. The control plane device includes a storage medium to store centralized control plane software, an IS-IS module and a local routing information base (RIB), and a processor communicatively coupled to the storage medium. The processor is configured to execute the control plane software. The control plane software is configured to implement the IS-IS module. The IS-IS module is configured to select a next next-hop for the default route, to look up a corresponding border node for the selected next-hop in a local routing information base (RIB), to select a next next-hop of the corresponding border node, to check whether the selected next-hop of the corresponding border node is the same as selected next-hop of default route, and to assign an LFA of the selected next-hop of the corresponding border node as LFA of the selected next-hop of the default route.

A computing device implementing a plurality of virtual machines for implementing network function virtualization (NFV), wherein a virtual machine from the plurality of virtual machines is configured to determine loop free alternatives (LFA) for each next hop in a default route to border nodes of a level 1 intermediate system-intermediate system (IS-IS) area of a network device. The computing device includes a storage medium to store an IS-IS module and a local routing information base (RIB), and a processor communicatively coupled to the storage medium. The processor is configured to execute the virtual machine, where the virtual machine is configured to implement the IS-IS module. The IS-IS module is configured to select a next next-hop for the default route, to look up a corresponding border node for the selected next-hop in a local routing information base (RIB), to select a next next-hop of the corresponding border node, to check whether the selected next-hop of the corresponding border node is the same as selected next-hop of default route, and to assign an LFA of the selected next-hop of the corresponding border node as LFA of the selected next-hop of the default route.

BRIEF DESCRIPTION OF THE DRAWINGS

The invention may best be understood by referring to the following description and accompanying drawings that are used to illustrate embodiments of the invention. In the drawings:

FIG. 6C illustrates various exemplary ways in which virtual network elements (VNEs) may be coupled according to some embodiments of the invention.

FIG. 6D illustrates a network with a single network element (NE) on each of the NDs of FIG. 6A, and within this straight forward approach contrasts a traditional distributed approach (commonly used by traditional routers) with a centralized approach for maintaining reachability and forwarding information (also called network control), according to some embodiments of the invention.

FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention.

DESCRIPTION OF EMBODIMENTS

Figure 1:
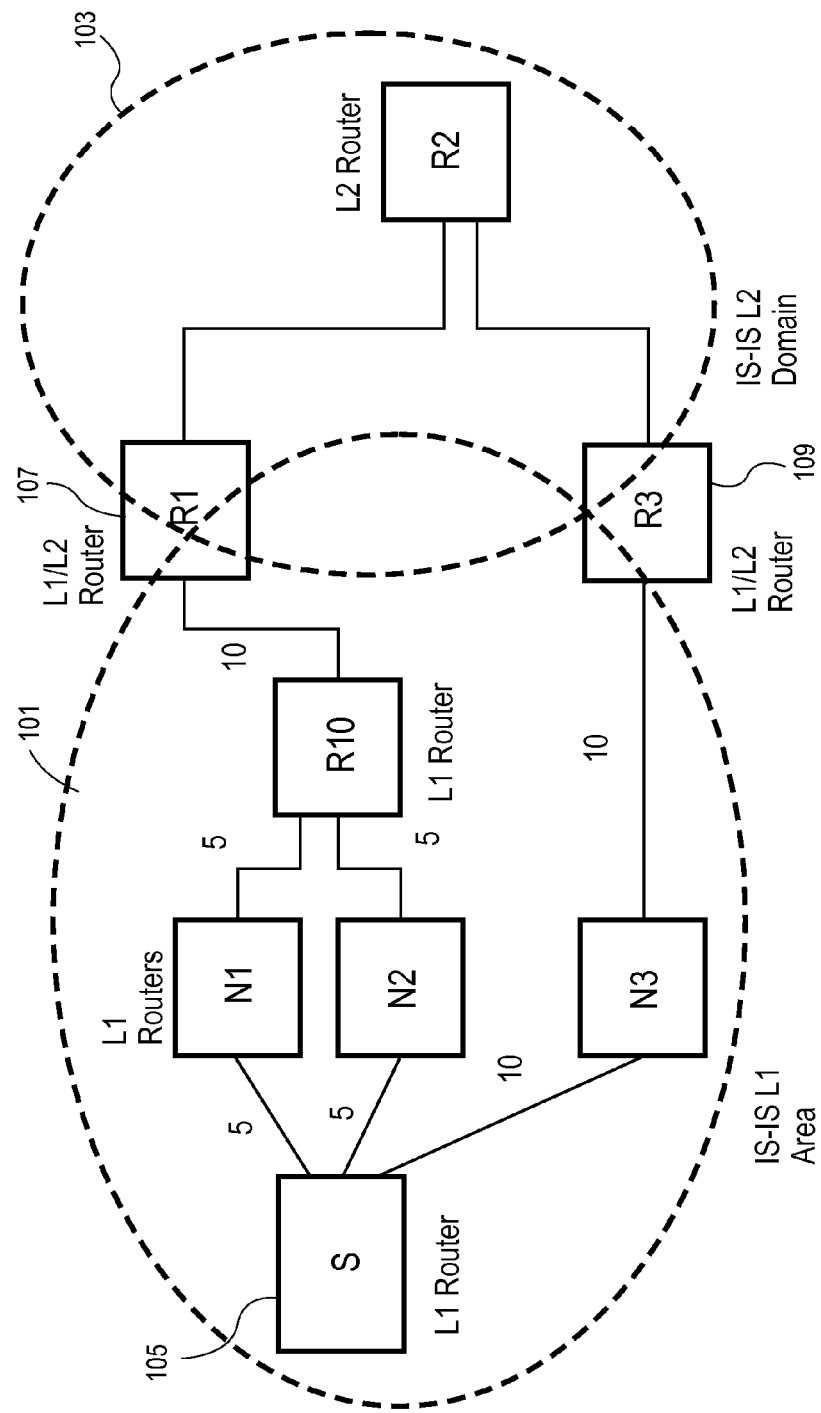
FIG. 1 is a diagram of one embodiment of a network topology having a level 1 IS-IS network area and a level 2 IS-IS network area.

The following description describes methods and apparatus for computation of LFA for default routes in an IS-IS network area. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

The processes for calculating the LFA for IS-IS area default routes described herein below can be applied for Internet Protocol version 4 (IPv4) and/or Internet Protocol version 6 (IPv6) default routes and topologies. The process can be applied to each (IPv4 and IPv6) in any order or in parallel. The processes for handling each (IPv4 and IPv6) are similar and for sake of clarity are not separately addressed.

FIG. 1 is a diagram of one embodiment of a network topology having a level 1 IS-IS network area and a level 2 IS-IS network domain. The example network topology is provided by way of example and not limitation to illustrate the LFA computation process. The example network topology includes two IS-IS areas. As used herein, an IS-IS level 1 network is referred to as an 'area,' whereas an IS-IS level 2 network is referred to as a 'domain.' A level 1 IS-IS area 101 and a level 2 IS-IS domain 103 are present in the example network. In this example, a level 1 (L1) router is treated as the source 'S' node and computations are considered from the perspective of the source node. However, one skilled in the art would understand that other level 1 routers in the IS-IS area 101 would make similar LFA computations from their respective perspectives.

In the example topology, there are two L1/L2 border routers R1 107 and R3 109. The level 1 IS-IS area 101 includes additional routers N1, N2, N3 and R10. The level 2 IS-IS domain includes additional router R2. The cost metric of each link is shown illustrating that the cost for the source node S to reach either border node R1 107 or R3 109 is 20. Using the shortest path first (SPF) or similar algorithm to determine default routes to the L1/L2 border routers results in the determination of paths with next hops to N1, N2 and/or N3.

Each of these routers can be any type of network device as defined herein. This example is used herein below with relation to the described embodiments. One skilled in the art would understand that the principles, processes and structures described herein are applicable to any IS-IS network having any number of network devices and in any configuration thereof.

Figure 2:
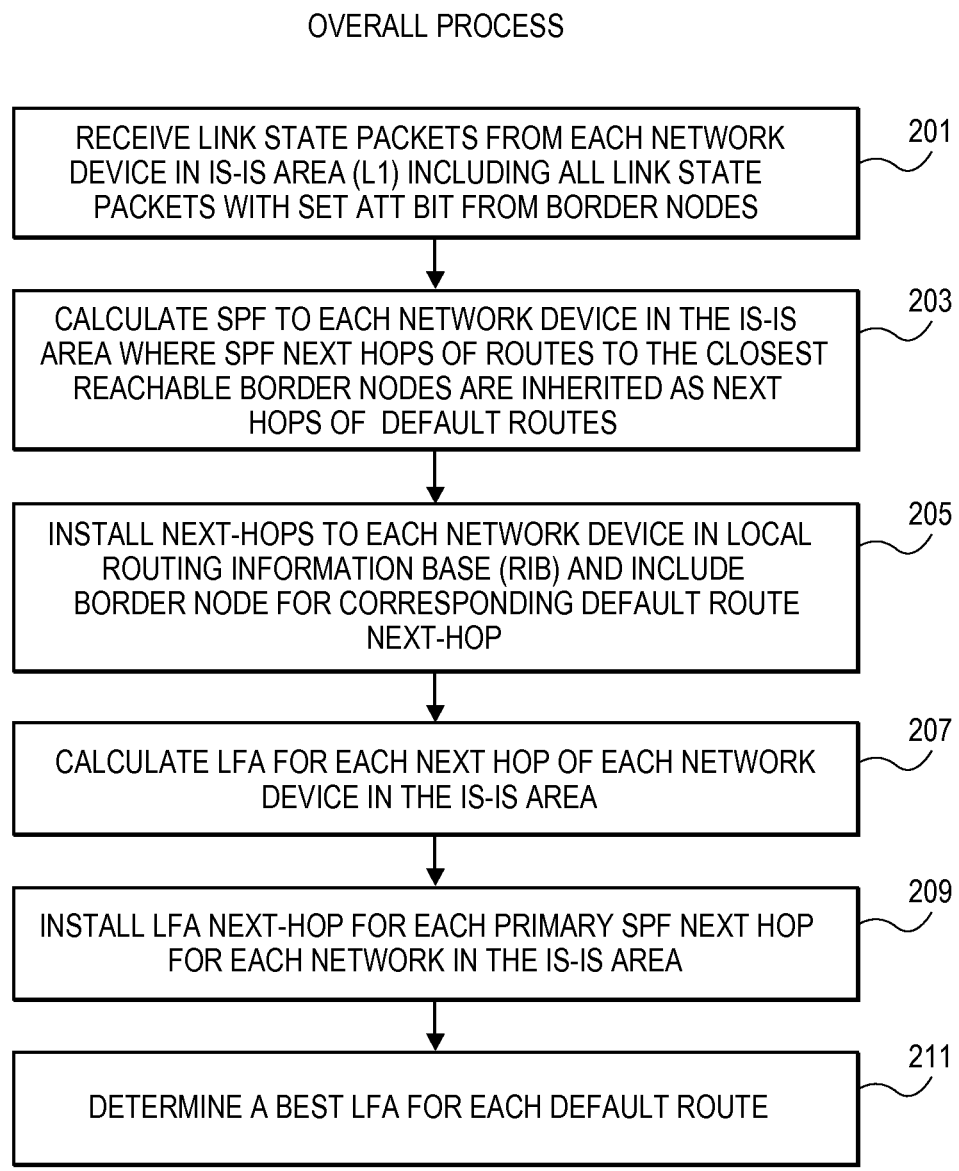
FIG. 2 is a flowchart of one embodiment of an IS-IS convergence process including LFA computation process for default routes in an IS-IS network area.

FIG. 2 is a flowchart of one embodiment of an IS-IS convergence process including LFA computation process for default routes in an IS-IS network area. In one embodiment, the convergence process begins with the receiving of link state packets according to the link state protocol (LSP) from each network device in the IS-IS are as described in RFC 1195 (Block 201). This exchange of link state data includes the receipt of attach bits from the L1/L2 border routers identifying them as such. This attach bit (ATT) is in the L1 LSP-0 fragment of the LSP packets received from the L1/L2 border router and serves to advertise the L1/L2 border router as router to which data can be sent that is destined for other IS-IS areas.

This link state data is utilized to construct a topology of the IS-IS area in a local link state protocol database. Using this data each of the network devices in the IS-IS area can determine routing to each of the other network devices in the IS-IS area using a route computation algorithm such as the shortest path first (SPF) algorithm or similar route computation algorithm (Block 203). A next hop for reaching each of the destination network devices in the IS-IS area is recorded in the local routing information base (RIB) to be utilized to forward packets to a given destination (Block 205). During this process of installing the next hops into the local RIB the identity of the border routers from which the advertised attach bit is received are recorded such that address associated with these border routers and the associated next hops are identified as the routes to these border routers and these routes are the default routes for the network device to be utilized for handling the forwarding of data destined for addresses outside of the IS-IS area. Where there are multiple equal cost paths having differing next hops to reach a given border router, each of the possible equal cost next hops are recorded in the local RIB as next hops for the default route.

The process then continues after all of the primary paths to the other network devices in the IS-IS area have been computed by computing loop free alternative paths (LFA) to each of the network devices in the IS-IS area (Block 207). The LFA can be calculated using the process defined in RFC 5286. The LFA next hops for each destination node can then be recorded in the local RIB to be utilized in the case of a link or node failure associated with the next hop of the primary path to a given destination (Block 209). With the LFA calculated for each of the network devices in the IS-IS area, the LFA for each default route can be calculated as discussed herein below with regard to FIG. 3.

Figure 3:
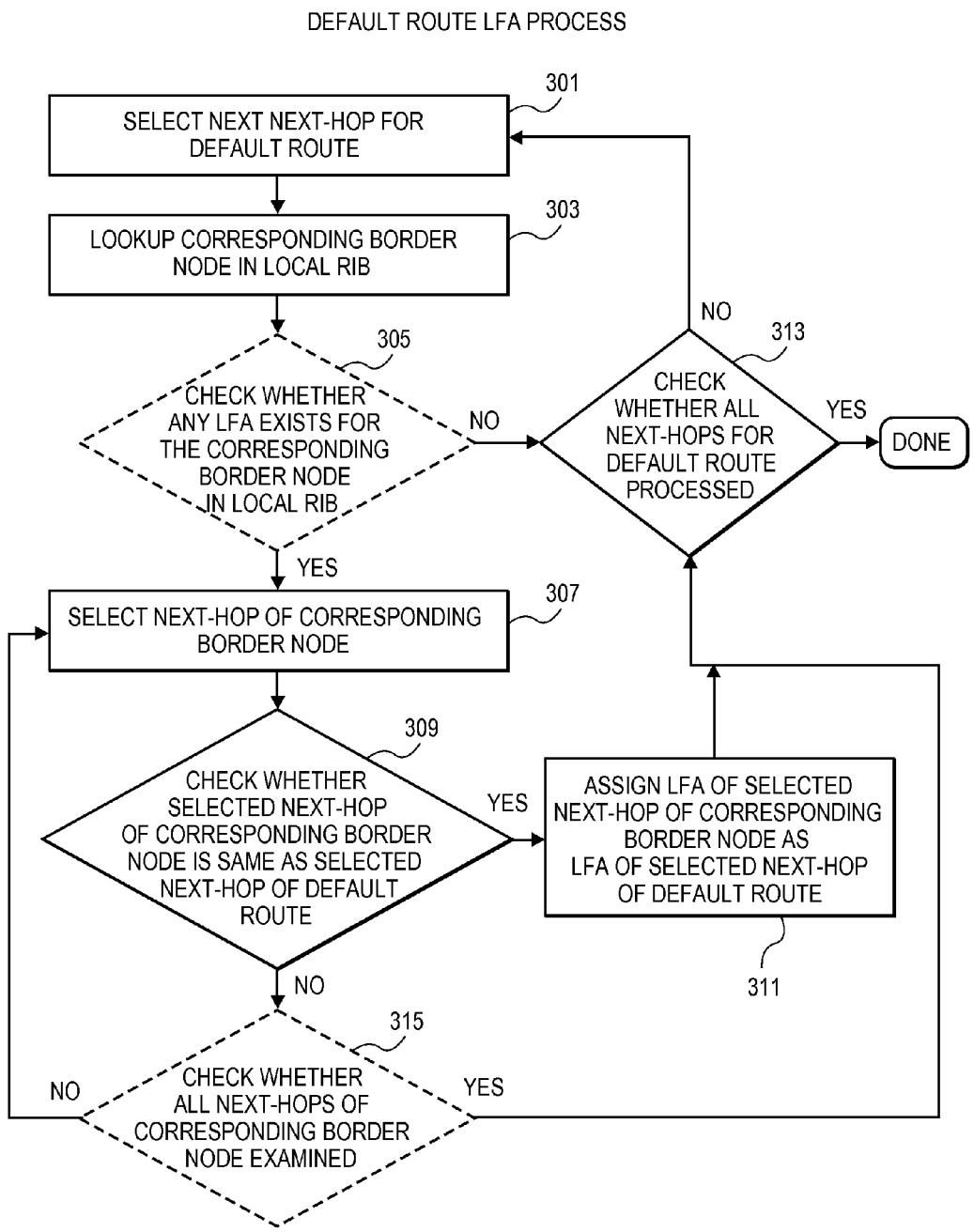
FIG. 3 is a flowchart of one embodiment of a LFA computation process for default routes in an IS-IS network area.

FIG. 3 is a flowchart of one embodiment of a LFA computation process for default routes in an IS-IS network area. In one embodiment, the process for determining LFA for each default route is initiated after LFA have been determined for all other destinations as described herein above. The default route has a set of next hops that were determined using the primary route computation algorithm such as the SPF algorithm. This set of next hops is accessed to select a next hop to be analyzed in an iterative process to find an LFA for each next hop (Block 301). For the selected next hop of the default route the corresponding L1/L2 border router is looked up in the local RIB where it was recorded during the computation of the primary paths to each of the network devices in the IS-IS area (Block 303).

In one embodiment, a check can be made to determine whether there exists any possible LFA to the border router (Block 305). The check can look into the local RIB to determine whether an LFA has been included for the primary path to the border router. If no path exists to the border router then the process checks whether there are any other next-hops associated with the default route that remain to be processed (Block 313). If there are additional next hops then the process selects another next hop (Block 301). However, if no next hops remain to be processed from the default route then the process completes.

In cases where LFAs exist for a given border router, the process proceeds by selecting a next hop of the border router to be analyzed (Block 307). A check is made whether the selected next hop of the border router is the same as the selected next hop of the default route (Block 309). If the next hop nodes are identical, then the process assigns the LFA of the selected next hop of the border router as the LFA of the selected next hop of the default route (Block 311). If the next hope nodes are not identical, then a check is made whether there are additional next hops for the corresponding border router that remain to be examined. If there are remaining next hops, then the process continues by selecting another next hop of the border router iteratively until a next hop that is identical to the next hop of the default route is found. If the LFA has been determined or all of the next hops have been exhausted, then the process can continue to check whether the default route has additional next hops to be processed (Block 313).

Returning the example network diagram of FIG. 1, an example application of the LFA computation process and the IS-IS process described in FIGS. 2 and 3 can be illustrated. After the LFA SPF computation (Block 207), the local RIB is queried to see if there is already a default route added by primary SPF because of any border node in the level 1 IS-IS area (Blocks 307-311). If such an LFA for the SPF computation is found for the border router, then an LFA for the default route can be added by taking advantage of the computation already carried out for the border routers from which the ATT bit is being advertised. This can be illustrated in two cases; the first one being simple and the second one with possible ECMPs.

In a simple case with reference to FIG. 1, if there were only one border router R1 and the routes to reach the border router R1 through neighbors N1 and N2 had differing costs (e.g., N1 having a lower cost), then the router S will have a primary SPF to R1 with next hop N1. The default route would have N1 as the next hop. The LFA for the default route would be inherited from the routing to R1, because the LFA computation is already computed for reaching R1. In this case, N2 is the alternate next hop for R1, because it is loop free and is computed for the router R1 per RFC 5286 (Block 207), which can be inherited by the default route as described in the process of FIG. 3.

The second case involves the illustrated topology of FIG. 1 where there are equal cost multi-paths (ECMP). In this embodiment, there are two border routers R1 and R3, which each would advertise the attach bit in their respective level 1 LSP-0 fragments in link state packets to inform the IS-IS level 1 area that they are border routers. The source router S will form a default route with next hop of N1, N2 and N3, because the border routers R1 and R3 are accessible through each of these next hops via ECMP. LFAs in this case will be inherited from the R1 and R3 border routers as these would be computed during LFA calculation as per RFC 5286.

Figure 4:
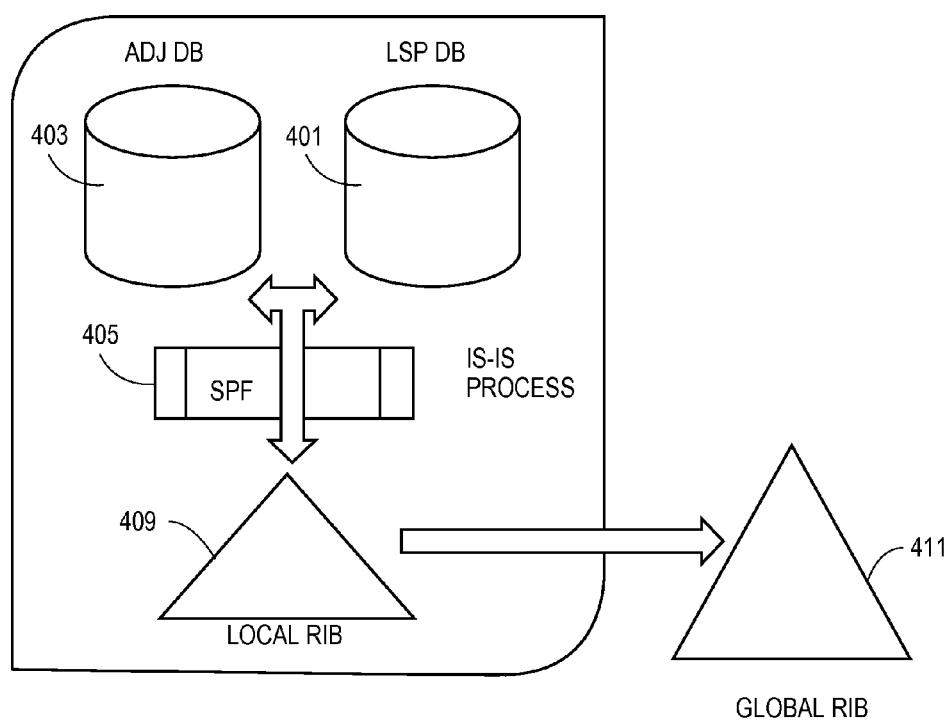
FIG. 4 is a diagram of the basic components of the IS-IS process.

FIG. 4 is a diagram of the basic components of the IS-IS process. The components of the network device that are utilized in the IS-IS process include an adjacency (ADJ) database 403, a link state protocol (LSP) database 401, a shortest path first (SPF) 405 or similar routing process, and a local RIB 409. The adjacency database 403 tracks adjacency information received from neighboring nodes connected through the physical ports and links of the network device. The link state protocol database 401 tracks the topology of the IS-IS area in which the network device is situated, which is based on exchange of link state packets. A shortest path first 405 or similar route computation algorithm processes the link state protocol database 401 to determine forwarding information that is stored in the local routing information base 409. In some embodiments, the local routing information base is synchronized or downloaded to a global routing information base 411 that is shared by all components of the network device such as line cards and similar components or that may be shared with other network devices in the IS-IS area.

Figure 5:
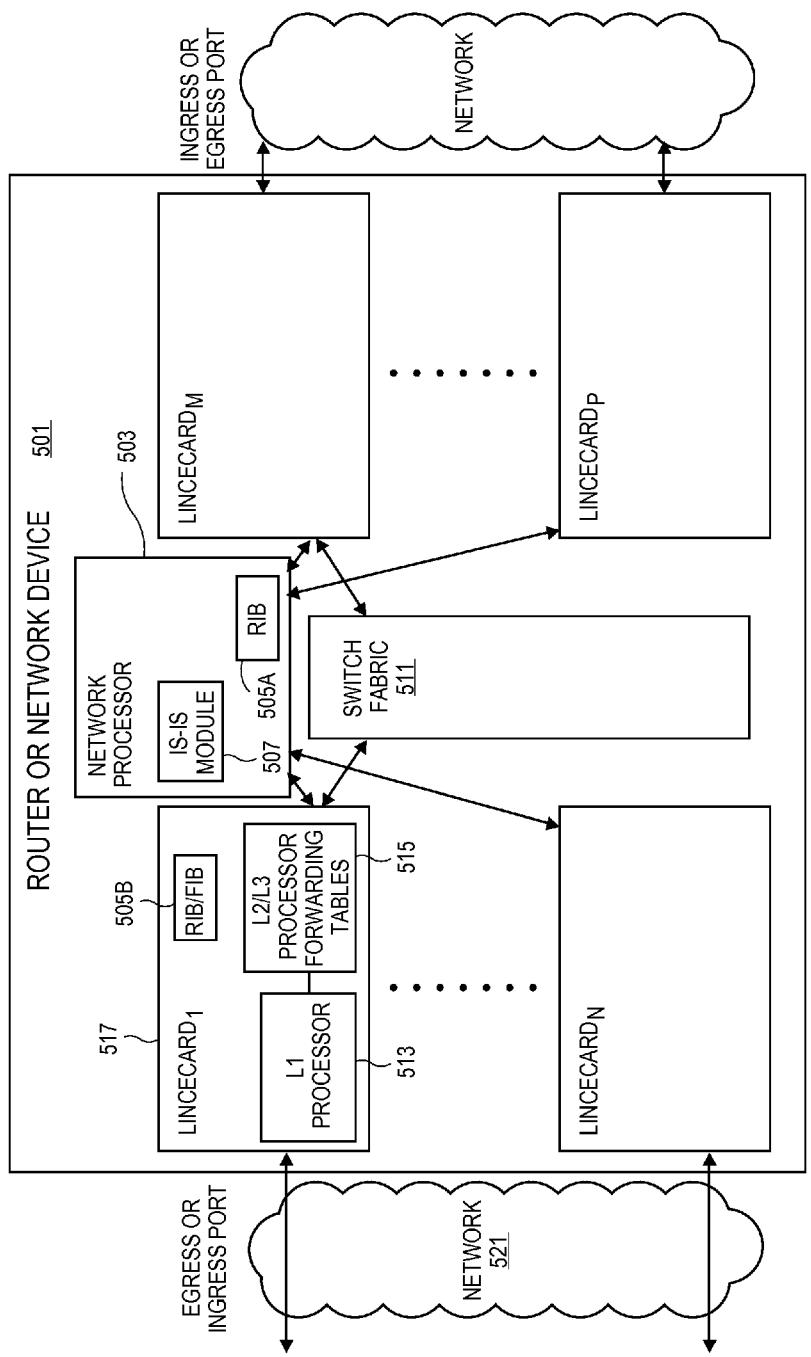
FIG. 5 is a diagram of one embodiment of a network device implementing the LFA computation process for default routes in an IS-IS network area.

FIG. 5 is a diagram of one embodiment of a network device implementing the LFA computation process for default routes in an IS-IS network area.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a router 501 or network device or similar computing device. The router 501 can have any structure that enables it to receive data traffic and forward it toward its destination. The router 501 can include a network processor 503 or set of network processors that execute the functions of the router 501. A 'set,' as used herein, is any positive whole number of items including one item. The router 501 or network element can execute IS-IS process functionality via a network processor 503 or other components of the router 501.

The IS-IS process functions can be implemented as modules in any combination of software, including firmware, and hardware within the router. The functions of the IS-IS process that are executed and implemented by the router 501 include those described further herein above.

In one embodiment, the router 501 can include a set of line cards 517 that process and forward the incoming data traffic toward the respective destination nodes by identifying the destination and forwarding the data traffic to the appropriate line card 517 having an egress port that leads to or toward the destination via a next hop. These line cards 517 can also implement the routing information base or forwarding information base 505B, or a relevant subset thereof. The line cards 517 can also implement or facilitate the IS-IS process functions described herein above. The line cards 517 are in communication with one another via a switch fabric 511 and communicate with other nodes over attached networks 521 using Ethernet, fiber optic or similar communication links and media.

In other embodiments, the processes can be implemented by a split-architecture node, where the control plane is remote from the data/forwarding plane. In this case, the IS-IS process can be carried out at any combination of the data plane nodes and the central controller.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

Figures 6A, 6B:
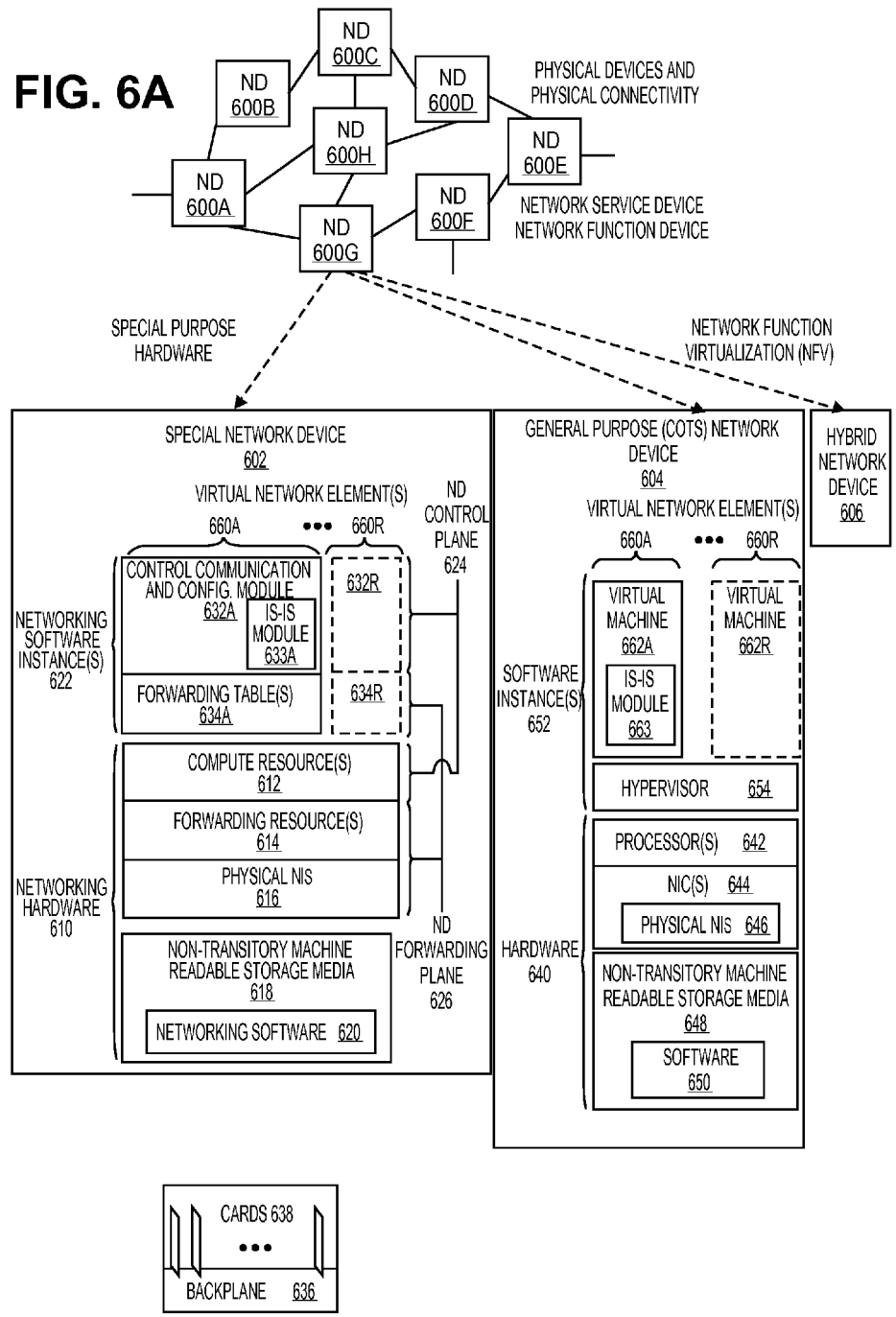
FIG. 6A illustrates connectivity between network devices (NDs) within an exemplary network, as well as three exemplary implementations of the NDs, according to some embodiments of the invention.
FIG. 6B illustrates an exemplary way to implement the special-purpose network device 602 according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). The IS-IS module 633A implements the processes described herein above as part of the Control communication and Configuration Module 632A or similar aspect of the networking software, which may be loaded and stored in the non-transitory machine readable media 618A or in a similar location.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporally shared by that virtual machine with others of the virtual machine(s) 662A-R), forms a separate virtual network element(s) 660A-R. In one embodiment, the virtual machines 632A-R may execute the described IS-IS module 663A and related software described herein above.

The virtual network element(s) 660A-R perform similar functionality to the virtual network element(s) 630A-R. For instance, the hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 6C illustrates various exemplary ways in which VNEs may be coupled according to some embodiments of the invention. FIG. 6C shows VNEs 670A.1-670A.P (and optionally VNEs 680A.Q-680A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the virtual machines 662A-R may operate as servers; the same would be true for the hybrid network device 606; in the case of the special-purpose network device 602, one or more such servers could also be run on a hypervisor executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 172 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane CA80 over the south bound interface 682 (which may use the OpenFlow protocol). Thus, the network intelligence is centralized in the centralized control plane 676 executing on electronic devices that are typically separate from the NDs. In one embodiment, the centralized reachability and forwarding information module 679 may include the IS-IS module 681 and related software as described herein above.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 174 can be implemented with the general purpose network device 604 (e.g., each of the VNE 'XA60A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 6A60A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
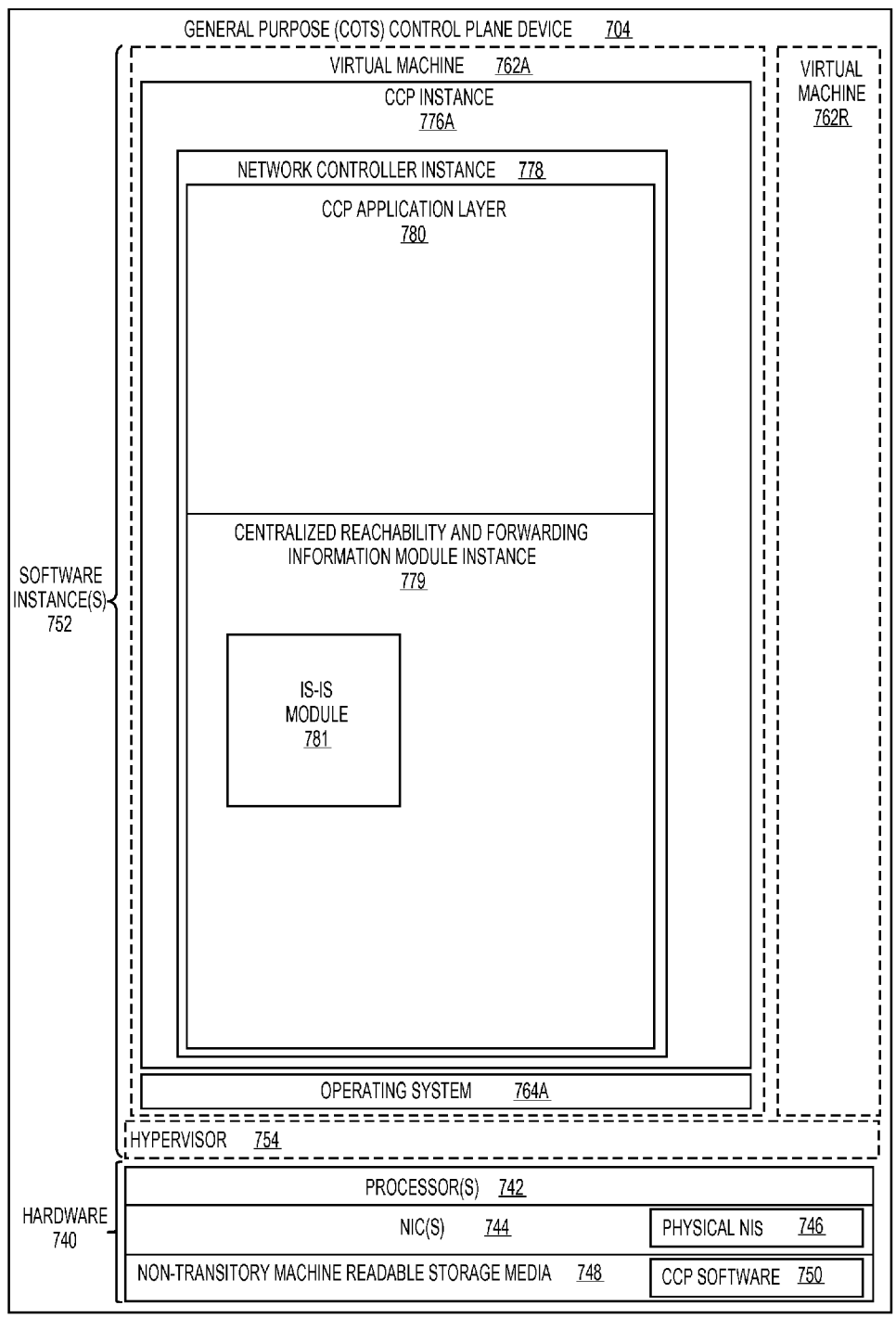
FIG. 7 illustrates a general purpose control plane device 704 including hardware 740 comprising a set of one or more processor(s) 742 (which are often Commercial off-the-shelf (COTS) processors) and network interface controller(s) 744 (NICs; also known as network interface cards) (which include physical NIs 746), as well as non-transitory machine readable storage media 748 having stored therein centralized control plane (CCP) software 750), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a hypervisor 754 (sometimes referred to as a virtual machine monitor (VMM)) and one or more virtual machines 762A-R that are run by the hypervisor 754; which are collectively referred to as software instance(s) 752. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 750 (illustrated as CCP instance 776A) on top of an operating system 764A are typically executed within the virtual machine 762A. In embodiments where compute virtualization is not used, the CCP instance 776A on top of operating system 764A is executed on the "bare metal" general purpose control plane device 704.

The operating system 764A provides basic processing, input/output (I/O), and networking capabilities. In some embodiments, the CCP instance 776A includes a network controller instance 778. The network controller instance 778 includes a centralized reachability and forwarding information module instance 779 (which is a middleware layer providing the context of the network controller 678 to the operating system 764A and communicating with the various NE5), and an CCP application layer 780 (sometimes referred to as an application layer) over the middleware layer (providing the intelligence required for various network operations such as protocols, network situational awareness, and user—interfaces). In one embodiment, the centralized reachability and forwarding information module 779 may include the IS-IS module 781 and related software as described herein above.

At a more abstract level, this CCP application layer 780 within the centralized control plane 676 works with virtual network view(s) (logical view(s) of the network) and the middleware layer provides the conversion from the virtual networks to the physical view.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions.

Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device to determine loop free alternatives (LFA) for each next hop in a default route to border nodes of a level 1 intermediate system-intermediate system (IS-IS) area of the network device, the method comprising the steps of:
   selecting a next next-hop for the default route;
   looking up a corresponding border node for the selected next-hop in a local routing information base (RIB) of the network device;
   selecting a next next-hop of the corresponding border node;
   checking, by the network device, whether the selected next-hop of the corresponding border node is the same as selected next-hop of default route; and
   assigning, by the network device, an LFA of the selected next-hop of the corresponding border node as LFA of the selected next-hop of the default route.

2. The method of claim 1, further comprising the step of:
   checking whether an LFA exists for the corresponding border node in the RIB.

3. The method of claim 1, further comprising the step of:
   looking up the LFA of the corresponding border node.

4. The method of claim 1, further comprising the step of:
   installing a next-hop for each network device in the RIB including recording a border node for each corresponding default route next-hop.

5. The method of claim 1, further comprising:
   calculating a shortest path first (SPF) to each of the network elements in the IS-IS area where next hops to border nodes are next hops for default routes.

6. The method of claim 1, further comprising:
   calculating an LFA for each next hop of each network device in the IS-IS area.

7. The method of claim 1, further comprising:
   installing a next-hop of each LFA for each SPF next hop of each network device in the IS-IS area in the local RIB.

8. The method of claim 1, wherein the default route is an Internet Protocol version 4 (IPv4) or Internet Protocol version 6 (IPv6) default route.

9. A network device configured to determine loop free alternatives (LFA) for each next hop in a default route to border nodes of a level 1 intermediate system-intermediate system (IS-IS) area of the network device, the network device comprising:
   a data store to store a routing information base (RIB); and
   a processor communicatively coupled to the data store, the processor configured to execute an IS-IS module, the IS-IS module configured to select a next next-hop for the default route, to look up a corresponding border node for the selected next-hop in a local routing information base (RIB), to select a next next-hop of the corresponding border node, to check whether the selected next-hop of the corresponding border node is the same as selected next-hop of default route, and to assign an LFA of the selected next-hop of the corresponding border node as LFA of the selected next-hop of the default route.

10. The network device of claim 9, wherein the IS-IS module is further configured to check whether an LFA exists for the corresponding border node in the RIB.

11. The network device of claim 9, wherein the IS-IS module is further configured to look up the LFA of the corresponding border node.

12. The network device of claim 9, wherein the IS-IS module is further configured to install a next-hop for each network device in the RIB including recording a border node for each corresponding default route next-hop.

13. The network device of claim 9, wherein the IS-IS module is further configured to calculate a shortest path first (SPF) to each of the network elements in the IS-IS area where next hops to border nodes are next hops for default routes.

14. The network device of claim 9, wherein the IS-IS module is further configured to calculate an LFA for each next hop of each network device in the IS-IS area.

15. The network device of claim 9, wherein the IS-IS module is further configured to install a next-hop of each LFA for each SPF next hop of each network device in the IS-IS area in the local RIB.

16. The network device of claim 9, wherein the default route is an Internet Protocol version 4 (IPv4) or Internet Protocol version 6 (IPv6) default route.

17. A non-transitory computer readable medium having instructions stored therein, which when executed determine loop free alternatives (LFA) for each next hop in a default route to border nodes of a level 1 intermediate system-intermediate system (IS-IS) area of a network device, the execution further causing the network device to perform a set of operations comprising:
   selecting a next next-hop for the default route;
   looking up a corresponding border node for the selected next-hop in a local routing information base (RIB);
   selecting a next next-hop of the corresponding border node;
   checking whether the selected next-hop of the corresponding border node is the same as selected next-hop of default route; and
   assigning an LFA of the selected next-hop of the corresponding border node as LFA of the selected next-hop of the default route.

18. A control plane device configured to implement at least one centralized control plane for a software defined network (SDN), the centralized control plane configured to determine loop free alternatives (LFA) for each next hop in a default route to border nodes of a level 1 intermediate system-intermediate system (IS-IS) area of a network device, the control plane device comprising:
   a storage medium to store centralized control plane software, an IS-IS module and a local routing information base (RIB); and
   a processor communicatively coupled to the storage medium, the processor configured to execute the control plane software, the control plane software to implement the IS-IS module, the IS-IS module configured to select a next next-hop for the default route, to look up a corresponding border node for the selected next-hop in a local routing information base (RIB), to select a next next-hop of the corresponding border node, to check whether the selected next-hop of the corresponding border node is the same as selected next-hop of default route, and to assign an LFA of the selected next-hop of the corresponding border node as LFA of the selected next-hop of the default route.

19. A computing device implementing a plurality of virtual machines for implementing network function virtualization (NFV), wherein a virtual machine from the plurality of virtual machines is configured to determine loop free alternatives (LFA) for each next hop in a default route to border nodes of a level 1 intermediate system-intermediate system (IS-IS) area of a network device, the computing device comprising:
   a storage medium to store an IS-IS module and a local routing information base (RIB); and
   a processor communicatively coupled to the storage medium, the processor configured to execute the virtual machine, where the virtual machine is configured to implement the IS-IS module, the IS-IS module configured to select a next next-hop for the default route, to look up a corresponding border node for the selected next-hop in a local routing information base (RIB), to select a next next-hop of the corresponding border node, to check whether the selected next-hop of the corresponding border node is the same as selected next-hop of default route, and to assign an LFA of the selected next-hop of the corresponding border node as LFA of the selected next-hop of the default route.

* * * * *